US007943392B2

(12) United States Patent
Hoshino et al.

(10) Patent No.: US 7,943,392 B2
(45) **Date of Patent: *May 17, 2011**

(54) DISCRIMINATION MEDIUM, DISCRIMINATION METHOD, ARTICLE TO BE DISCRIMINATED, AND DISCRIMINATION APPARATUS

(75) Inventors: Hidekazu Hoshino, Yokohama (JP); Itsuo Takeuchi, Yokohama (JP); Tokio Sakauchi, Yokohama (JP); Susumu Oaku, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 415 days.

This patent is subject to a terminal disclaimer.

(21) Appl. No.: 10/576,965

(22) PCT Filed: Oct. 27, 2004

(86) PCT No.: PCT/JP2004/015898

§ 371 (c)(1), (2), (4) Date: Apr. 25, 2006

(87) PCT Pub. No.: WO2005/040871

PCT Pub. Date: May 6, 2005

(65) Prior Publication Data

US 2007/0037290 A1 Feb. 15, 2007

(30) Foreign Application Priority Data

Oct. 28, 2003 (JP) ................................ 2003-368035

(51) Int. Cl.

| | |
|---|---|
| ***G01N 21/77*** | (2006.01) |
| *G03H 1/00* | (2006.01) |
| *G02F 1/1335* | (2006.01) |
| *B29C 65/00* | (2006.01) |
| *G01N 21/75* | (2006.01) |

(52) U.S. Cl. .............. 436/170; 359/2; 349/96; 156/277; 422/55; 422/400

(58) Field of Classification Search ........ 359/2; 422/55; 436/170

See application file for complete search history.

(56) References Cited

U.S. PATENT DOCUMENTS 4,761,543 A * 8/1988 Hayden ........................ 235/457

(Continued)

FOREIGN PATENT DOCUMENTS

EP 1 028 359 A1 8/2000
EP 1028359 A1 * 8/2000

(Continued)

OTHER PUBLICATIONS

"Interface" online definition, <www.dictionary.com>, Dec. 18, 2009.*

*Primary Examiner* — Sam P Siefke
*Assistant Examiner* — Bryan T Kilpatrick
(74) *Attorney, Agent, or Firm* — Oliff & Berridge, PLC

(57) ABSTRACT

A discrimination medium cannot be easily falsified. Since the visibility of the discrimination medium is unique, the discrimination medium is superior in determination of the authenticity. The discrimination medium is structured such that a cholesteric liquid crystal layer 106 and a multilayer film 103 having plural light transparent films which are laminated and are different from each other in refraction index are laminated. The reflection light reflected by the discrimination medium includes circular polarization lights which are different in polarization direction, and the discrimination medium has unique optical characteristics. A discrimination method using the above unique optical characteristics, an article to be discriminated by the discrimination medium, and a discrimination apparatus using the above unique optical characteristics are provided.

9 Claims, 4 Drawing Sheets

U.S. PATENT DOCUMENTS

| | | | | |
|---|---|---|---|---|
| 6,072,549 | A | 6/2000 | Faris et al. | |
| 6,734,936 | B1 | 5/2004 | Schadt et al. | |
| 7,179,393 | B2 | 2/2007 | Isherwood et al. | |
| 7,201,821 | B2 * | 4/2007 | Hoshino et al. | 156/277 |
| 7,388,627 | B2 * | 6/2008 | Hoshino et al. | 349/96 |
| 7,391,546 | B2 * | 6/2008 | Hoshino et al. | 359/2 |
| 2002/0051264 | A1 * | 5/2002 | Shiozawa et al. | 359/2 |
| 2003/0138609 | A1 | 7/2003 | Wada et al. | |

FOREIGN PATENT DOCUMENTS

| | | | |
|---|---|---|---|
| EP | 1 300 255 | A1 | 4/2003 |
| JP | A 4-144796 | | 5/1992 |
| JP | A 2000-255200 | | 9/2000 |
| JP | A 2002-71953 | | 3/2002 |
| WO | WO 98/52077 | A1 | 11/1998 |
| WO | WO00/13065 | | 3/2000 |
| WO | WO 03/061980 | A1 | 7/2003 |

* cited by examiner

DISCRIMINATION MEDIUM, DISCRIMINATION METHOD, ARTICLE TO BE DISCRIMINATED, AND DISCRIMINATION APPARATUS

TECHNICAL FIELD

The present invention relates to techniques advantageously used for determining whether or not passports, documents, various cards, passes, bills, exchange tickets for money, bonds, security notes, gift certificates, pictures, tickets, public game voting tickets, recording media in which sound data and image data are recorded, recording media in which computer software is recorded, and packages of various products are authentic.

BACKGROUND ART

In order to prevent illegal use of articles, for example, various cards for adjustment, and certificates, etc., techniques for determining whether or not they are authentic are necessary.

Techniques of applying a special ink on a surface of an article have been known as the above technique. For example, predetermined characters or figures may be printed on an article by using an ink which is fluorescent under ultraviolet light is used as the above ink. When ultraviolet light is irradiated on the article, the characters or patterns become visible on the article, so that the authenticity of the article can be determined. For example, an ink having particles of a magnetic material or magnetized particles mixed therewith may be applied on an article, and the authenticity of the article can be determined by magnetic sensors.

Techniques of using a hologram for determining the authenticity of an article have been known. Techniques of using optical characteristics of cholesteric liquid crystal have been known as techniques for prevention of falsification of securities by copying, as disclosed in Patent Publication 1.

The Patent Publication 1 is Japanese Unexamined Patent Application Publication No. Hei 4-144796.

DISCLOSURE OF THE INVENTION

Problems Solved by the Invention

However, in techniques in which a special ink is applied on an article, it is relatively easy to obtain the special ink and to misuse it, and prevention of falsification of the special ink is not very difficult. In techniques using holograms, falsification techniques of holograms has been improved, and counterfeit goods for which the authenticity is difficult to determine may be produced. Therefore, techniques in which it is difficult to falsify are required.

In techniques using cholesteric liquid crystal, even when the discrimination medium using cholesteric liquid crystal is obtained and a counterfeit discrimination medium is produced, the discrimination medium is required to exhibit complicated and specific optical characteristics, so that a counterfeit discrimination medium exhibiting the same optical characteristics as an authentic one are difficult to produce.

In a discrimination medium using optical characteristics, not only difficulty in falsification but also specific optical characteristics which are superior in determining the authenticity of the article, that is, in which the authenticity of the article can be quickly determined, are required.

An object of the present invention is to provide a discrimination medium which is difficult to falsify and is superior in determining the authenticity of an article. Another object of the present invention is to provide an article having the above discrimination medium. Another object of the present invention is to provide a discrimination method and a discrimination apparatus which are superior in determining the authenticity of an article.

Means for Solving the Problems

The present invention provides a discrimination medium having a cholesteric liquid crystal layer and a multilayer film having plural light transparent films which are different from each other in refraction index. In the discrimination medium, optical characteristics of the cholesteric liquid crystal layer and the multilayer film are synergistically used, so that unique optical characteristics which could not be obtained in the conventional techniques can be obtained.

Optical characteristics of a cholesteric liquid crystal layer will be explained. FIG. 2 is a conceptual diagram showing a structure of the cholesteric liquid crystal layer. The cholesteric liquid crystal has a layered structure. The molecular long axes of respective layers of the stacked structure are parallel to each other, and are parallel to the plane thereof. The respective layers are rotated slightly with respect to the adjacent layer and are stacked. The cholesteric liquid crystal thereby has a three-dimensional spiral structure.

Denoting that, in a direction perpendicular to the layer, pitch is a distance needed when the molecular long axis is rotated through 360 degrees and returns to the initial state, and an average refraction index of the respective layers is index N, the cholesteric liquid crystal layer selectively reflects circularly polarized light having a center wavelength $\lambda s$ satisfying the equation $\lambda s = N \times P$. That is, when light (natural light) which is not predetermined circularly polarized light is irradiated on the cholesteric liquid crystal layer, the cholesteric liquid crystal layer selectively reflects circularly polarized light having a center wavelength $\lambda s$. The polarization direction of the circularly polarized light reflected by the cholesteric liquid crystal layer is clockwise or counterclockwise depending on the rotation direction of the cholesteric liquid crystal layer. That is, circularly polarized light having the above predetermined center wavelength and the above predetermined circular polarization direction is selectively reflected by the cholesteric liquid crystal layer. Circularly polarized light having another wavelength and the above predetermined circular polarization direction, linearly polarized light, and circularly polarized light having circular polarization direction opposite to the above predetermined circular polarization direction passes through the cholesteric liquid crystal layer.

FIG. 3 is a conceptual diagram showing a condition in which light having a predetermined wavelength and a predetermined circular polarization direction is selectively reflected by a cholesteric liquid crystal layer 106. For example, FIG. 2 shows a cholesteric liquid crystal layer 106 having a spiral structure in which the molecular long axes of the respective layers are rotated in a clockwise direction (right-handed direction). When natural light enters to the cholesteric liquid crystal layer 106, right-handed circularly polarized light having the predetermined center wavelength is selectively reflected by the cholesteric liquid crystal layer 106. Another polarization light (linearly polarized light and left-handed circularly polarized light) and right-handed circularly polarized light having another center wavelength pass through the cholesteric liquid crystal layer 106.

For example, a cholesteric liquid crystal layer having a structure shown in FIG. 2 and reflecting light having a center wavelength λs of red light is disposed on a member such as a black sheet absorbing visible light. When random light such as sunlight is irradiated on the cholesteric liquid crystal layer, transmission light of the cholesteric liquid crystal layer is absorbed in the black sheet, and right-handed circularly polarized light having the predetermined center wavelength is selectively reflected by the cholesteric liquid crystal layer. As a result, the cholesteric liquid crystal layer is clearly seen to be red.

The above characteristic of selectively reflecting predetermined circularly polarized light having a predetermined center frequency is called circularly polarized light selectivity.

The color of the cholesteric liquid crystal changes depending on the viewing angle. When incident light obliquely enters into the cholesteric liquid crystal, the apparent pitch P decreases, and the center wavelength λs is thereby short. For example, reflection light reflected by the cholesteric liquid crystal is seen to be red at an angle perpendicular to the cholesteric liquid crystal. As the viewing angle is increased, the color of light shifts to orange, yellow, green, blue-green, and blue in turn. This phenomenon is called blue shift. The viewing angle is an angle of a visual line with respect to a line perpendicular to a viewing surface.

Optical characteristics of a multilayer film having plural light transparent films which are different from each other in refraction index will be explained. FIG. 4 is a conceptual diagram showing a condition in which the multilayer film reflects light. FIG. 4 shows one example in which films 401 (A layers) having a first refraction index and films 402 (B layers) having a second refraction index are alternately laminated.

When white light is irradiated on the multilayer film 403, incident light is reflected at the interfaces of the films different from each other in refraction index based on Fresnel's law. In this case, a portion of the incident light is reflected at the interface between the A layer and the B layer, and another portion of the incident light passes therethrough. Since each interface between the A layer and the B layer repeatedly exists, interferences between reflection light reflected at each interface occur. The larger the angle of the incident light, the shorter the optical path difference of the reflection light reflected by each interface. The interference of each light of the shorter wavelength occurs, and the intensity of the light of the shorter wavelength is thereby strong. Therefore, the more obliquely the multilayer film 403 on which white light is irradiated is viewed, that is, the more parallel to the plane of the multilayer film 403 the multilayer film 403 on which white light is irradiated is viewed, the shorter the wavelength of the light reflected strongly by the multilayer film 403. For example, the more oblique the multilayer film 403 on which white light is irradiated, the bluer the reflection light reflected by the multilayer film 403. This phenomenon is called blue shift. The incident angle is an angle between incident light and a line perpendicular to the incident surface.

The discrimination medium structured such that the cholesteric liquid crystal layer and the multilayer film having plural light transparent films which are different from each other in refraction index are laminated exerts unique visual effects in the following manner by synergistically exerting the above two unique optical properties.

The above unique optical visual effects will be explained hereinafter. FIGS. 5 and 6 are conceptual diagrams showing the conditions in which light is reflected by a laminated structure having the cholesteric liquid crystal layer and the multilayer film. In FIGS. 5 and 6, a laminated structure 503 has a cholesteric liquid crystal layer 501 and a multilayer film 502 which are laminated. The cholesteric liquid crystal layer 501 selectively reflects circularly polarized light, and the multilayer film 502 has a structure as shown in FIG. 4.

When natural light enters to the laminated structure 503 at an incident angle θ, right-handed circularly polarized light having a predetermined center wavelength is reflected by the cholesteric liquid crystal layer 501. Right-handed circularly polarized light having a center wavelength other than the predetermined center wavelength, left-handed circularly polarized light, and linearly polarized light pass through the cholesteric liquid crystal layer 501, and portions thereof are reflected by the multilayer film 502. Theoretically, when left-handed circularly polarized light having a predetermined center wavelength is reflected by the multilayer film 502, the polarization direction of the light is inverted, and the light becomes right-handed circularly polarized light. Therefore, the reflection light reflected by the multilayer film 502 of the left-handed circularly polarized light passing through the cholesteric liquid crystal layer 501 cannot pass through the cholesteric liquid crystal layer 501. However, practically, the incident light entering to the multilayer film 502 includes linearly polarized light. Since reflection occurs at each interface, left-handed circularly polarized light is generated as the reflection light. That is, the reflection light reflected by the multilayer film 502 includes left-handed circularly polarized light. The light reflected by the multilayer film 502 and thereby having the right-handed circularly polarized direction is reflected by the cholesteric liquid crystal layer 501 is reflected by the multilayer film 502 again, and thereby changes to left-handed circularly polarized light. Therefore, the light passes through the cholesteric liquid crystal layer 501.

Left-handed circularly polarized light passes through the cholesteric liquid crystal layer 501. Therefore, the laminated structure 503 is viewed at an angle, right-handed circularly polarized light reflected by the cholesteric liquid crystal layer 501 and left-handed circularly polarized light reflected by the multilayer film 502 are seen simultaneously.

For example, a case in which the laminated structure 503 is viewed at the angle θ is considered. In this case, the pitch P of the cholesteric liquid crystal layer 501 and the average refraction index of each layer thereof are set such that right-handed circularly polarized light reflected by the cholesteric liquid crystal layer 501 is seen to be blue. In addition, the material of the multilayer film 502 and thickness of each layer thereof are set such that the interference of the reflection light reflected by each interface occurs in a blue wavelength region when the multilayer film 502 is viewed at the angle θ.

In the above case, right-handed circularly polarized blue light reflected by the cholesteric liquid crystal layer 501 and left-handed circularly polarized blue light reflected by the multilayer film 502 are seen simultaneously. Therefore, the blue reflection light is strongly visible in comparison to the case in which the reflection light is reflected by only the cholesteric liquid crystal layer 501. When the reflection light reflected by the laminated structure 503 is viewed via an optical filter allowing only right-handed circularly polarized light to pass therethrough, the left-handed circularly polarized blue light and the linearly polarized light reflected by the multilayer film 502 are blocked by the optical filter, and the reflection light is seen to be weak in comparison to the case in which the optical filter is not used. On the other hand, when the reflection light reflected by the laminated structure 503 is viewed via an optical filter allowing only left-handed circularly polarized light to pass therethrough, only left-handed circularly polarized light reflected by the multilayer film 502 is seen to be weak in comparison to the case in which the optical filter is not used.

The following discrimination medium can be obtained by using the above principle. That is, the cholesteric liquid crystal layer 501 and the multilayer film 502 are subjected to hologram working, and for example, a predetermined logo or a figure is seen by a hologram effect. In this case, when the laminated structure 503 is directly viewed, holograms formed in the cholesteric liquid crystal layer 501 and the multilayer film 502 appear to be overlapped. On the other hand, when the laminated structure 503 is viewed via an optical filter allowing predetermined circularly polarized light to pass therethrough, only one of the holograms is seen. In the above manner, a discrimination medium having unique visual effects can be obtained. When figures made by embossing or printing are used instead of the holograms, a discrimination medium having unique visual effects can be obtained.

As shown in FIG. 6, when the laminated structure 503 is viewed at the angle θ, right-handed circularly polarized light reflected by the cholesteric liquid crystal layer 501 is seen to be red, and left-handed circularly polarized light reflected by the multilayer film 502 is seen to be blue. In this case, when the laminated structure 503 is directly viewed, the reflection light including right-handed circularly polarized red light and blue light can be seen. When the viewing angle is changed, the color of the reflection light is changed based on blue shift.

When the reflection light is viewed via an optical filter allowing left-handed circularly polarized light to pass therethrough, right-handed circularly polarized light reflected by the cholesteric liquid crystal layer 501 is blocked not to be seen, and only blue reflection light can be seen. On the other hand, when the reflection light is directly viewed without an optical filter, the color including red and blue is seen. In a case in which the laminated structure 503 has figures, when the laminated structure 503 is viewed, the one figure can be seen, and the other figure cannot be seen. As described above, visual effects can be obtained.

That is, according to one aspect of the present invention, a discrimination medium includes: a cholesteric liquid crystal layer having a circularly polarized light selectivity of reflecting predetermined circularly polarized light; and a multilayer film having plural light transparent films which are laminated and are different from each other in refraction index. In a preferred embodiment of the present invention, when the discrimination medium is viewed at a predetermined angle, a first reflection light reflected by the cholesteric liquid crystal layer and a second reflection light reflected by the multilayer film are approximately equal to each other in color. In this case, the first reflection light may be circularly polarized light having a predetermined center wavelength and a predetermined polarization direction, and the second reflection light may include circularly polarized light having a circular polarization direction opposite to that of the first reflection light. In a preferred embodiment of the present invention, when the discrimination medium is viewed at a predetermined angle, a first reflection light reflected by the cholesteric liquid crystal layer and a second reflection light reflected by the multilayer film are different from each other in color. In this case, the first reflection light is circularly polarized light having a predetermined center wavelength and a predetermined circular polarization direction, and the second reflection light includes circularly polarized light having a circular polarization direction opposite to that of the first reflection light, circularly polarized light having the same circular polarization direction as that of the first reflection light, and linearly polarized light.

In the above aspect of the present invention, unique optical characteristics can be obtained which are not simply combined with optical characteristics shown by the cholesteric liquid crystal layer and optical characteristics shown by the multilayer film having plural light transparent films which are different from each other in refraction index. That is, when natural light is irradiated on the discrimination medium of the present invention, the reflection light includes right-handed circularly polarized light and left-handed circularly polarized light. The cholesteric liquid crystal layer selectively reflects predetermined circularly polarized light. On, the other hand, the multilayer film does not selectively reflect circularly polarized light having a circular polarization direction opposite to that of the predetermined circularly polarized light. However, in combination with the cholesteric liquid crystal layer and the multilayer film, as described above, right-handed circularly polarized light, left-handed circularly polarized light, and linearly polarized light are reflected by the discrimination medium.

Since blue shift is combined with the above unique optical characteristics, optical characteristics which can be easily discriminated can be obtained. Since the optical characteristics are difficult to reproduce by reverse-engineering, falsification of the discrimination medium is difficult. This case is preferable for a discrimination medium used for determining the authenticity thereof.

The multilayer film having plural light transparent films which are different from each other in refraction index is structured such that at least two kinds of light transparent films which are different from each other in refraction index are laminated, and at least one interface between the light transparent films which are different from each other in refraction index exists. For example, the multilayer film is structured such that two light transparent films which are different from each other in refraction index are alternately laminated. Alternatively, the multilayer film is structured such that the first to the Nth light transparent films having the first to the Nth refraction indexes are laminated in turn as one unit and plural units are laminated. The N in Nth denotes a natural number.

In a preferred embodiment of the present invention, a figure is provided at at least a portion of at least one of the cholesteric liquid crystal layer and the multilayer film. In this embodiment, the discrimination medium can use the unique visibility of the figure.

The figure may be a character, a logo, a graphic, a pattern, or one having a design producing visual effects for a viewer. The figure may be provided at the above portion by printing an ink, applying a film, transferring, stamping, or embossing. The figure is preferably formed by hologram working. The figure may be formed by combination of the above methods.

According to another aspect of the present invention, an article to be discriminated, for example, a card, includes the discrimination medium of the present invention, so that the article has a discrimination medium portion showing unique visual effects which can be easily discriminated. The article may be one of passports, documents, various cards, passes, bills, exchange tickets for money, bonds, security notes, gift certificates, pictures, tickets, public game voting tickets, recording media in which sound data and image data are recorded, recording media in which computer software is recorded, various products, and packages of the products.

In another aspect of the present invention, a discrimination method for discriminating a discrimination medium is provided. The discrimination medium includes: a cholesteric liquid crystal layer having a circular polarization light selectivity of reflecting predetermined circularly polarized light; and a multilayer film having plural light transparent films which are laminated and are different from each other in refraction index. The discrimination method includes: an optical filter allowing predetermined circularly polarized light to selectively pass therethough. The discrimination medium is viewed via the optical filter.

In the above aspect of the present invention, the reflection light reflected by the discrimination medium includes lights which are different from each other in polarization direction. Therefore, the case in which the discrimination medium is directly viewed and the case in which the discrimination medium is viewed via the optical filter allowing predetermined circularly polarized light to selectively pass therethough are different from each other in visibility of the discrimination medium. The discrimination medium can be discriminated by using the degree of the difference in visibility. The degree of the difference in visibility can be set to be flexible and complicated by combination of designs of the cholesteric liquid crystal layer and the multilayer film, and the figure.

In another aspect of the present invention, a discrimination method for discriminating a discrimination medium is provided. The discrimination medium includes: a cholesteric liquid crystal layer having a circularly polarized light selectivity of reflecting predetermined circularly polarized light; and a multilayer film having plural light transparent films which are laminated and are different from each other in refraction index. Predetermined circularly polarized light is irradiated on the discrimination medium, and reflection light reflected by the discrimination medium is viewed.

In the above aspect of present invention, the reflection light reflected by the discrimination medium includes lights which are different from each other in polarization direction. Therefore, the case in which natural light is irradiated on the discrimination medium and the case in which predetermined circularly polarized light is irradiated on the discrimination medium are different from each other in reflection light reflected by the discrimination medium. As a result, the above cases are different in visibility of the discrimination medium. The discrimination medium can be discriminated by using the above phenomenon.

In another aspect of the present invention, a discrimination apparatus for discriminating a discrimination medium is provided. The discrimination medium includes: a cholesteric liquid crystal layer having a circularly polarized light selectivity of reflecting predetermined circularly polarized light; and a multilayer film having plural light transparent films which are laminated and are different from each other in refraction index. The discrimination apparatus includes: an optical filter allowing predetermined circularly polarized light to selectively pass therethough; and a detector detecting light which passes though the optical filter.

In another aspect of the present invention, a discrimination apparatus for discriminating a discrimination medium is provided. The discrimination medium includes: a cholesteric liquid crystal layer having a circularly polarized light selectivity of reflecting predetermined circularly polarized light; and a multilayer film having plural light transparent films which are laminated and are different from each other in refraction index. The discrimination apparatus includes: a light irradiation device irradiating predetermined circularly polarized light on the discrimination medium; and a detector detecting reflection light which is reflected by the discrimination medium.

Effects of the Invention

According to one aspect of the present invention, the discrimination medium cannot be easily falsified. Since the visibility of the discrimination medium is unique, the discrimination medium is superior in determination of the authenticity. According to another aspect of the present invention, the article having the above discrimination medium is provided. According to another aspect of the present invention, the discrimination method and the discrimination apparatus are superior in determination of the authenticity.

In the discrimination medium of the present invention, since the discrimination medium can be discriminated by complicated combination of the left-handed circularly polarized light, right-handed circularly polarized light, the color, the figure, and the optical phenomenon of the color shift, falsification cannot be performed by using a copy in which images are scanned. The discrimination medium is superior in color, and is thereby superior in design, so that the discrimination medium is advantageous for an article having superior design as the article to be discriminated.

EXPLANATION OF REFERENCE NUMERALS

100 denotes a discrimination medium, 101 denotes an article, 102 denotes an adhesive layer, 103 denotes a multilayer film, 104 denotes an adhesive layer, 105 denotes a hologram, 106 denotes a cholesteric liquid crystal layer, 107 denotes a surface protection layer, 108 denotes a printed figure, 401 denotes a light transparent film, 402 denotes a light transparent film, 403 denotes a multilayer film, 501 denotes a cholesteric liquid crystal layer, 502 denotes a multilayer film, 503 denotes a laminated structure, 801 denotes a pedestal, 802 denotes an article, 803 denotes a discrimination medium, 804 denotes a white lamp, 805 denotes an optical filter, 806 denotes a photodetector, and 807 denotes an optical filter.

BEST MODE FOR CARRYING OUT THE INVENTION

First Embodiment

1. Structure of Embodiment

Figure 1:
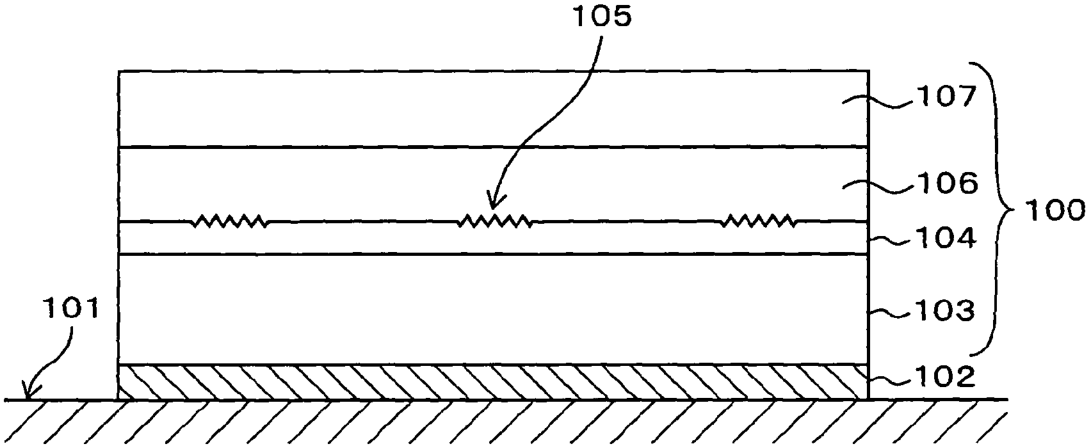
FIG. 1 is a cross sectional view showing a discrimination medium in cross section.

FIG. 1 shows a cross sectional diagram of a discrimination medium of an embodiment of the present invention. FIG. 1 shows a discrimination medium 100 using the present invention which is applied and fixed to a predetermined article 101 such as a card by an adhesive layer 102. The discrimination medium 100 is structured such that a multilayer film 103, an adhesive layer 104, a cholesteric liquid crystal layer 106, and a surface protection layer 107 are laminated.

The adhesive layer 102 fixes the discrimination medium 100 to the article 101. The adhesive layer 102 is composed of a material which is, for example, a seal exhibiting adhesion when a release film thereof is peeled from the article 101. Alternatively, the adhesive layer 102 is composed of one material selected from the group consisting of an ultraviolet light curable resin, a thermosetting resin, and other known adhesive materials. The adhesive layer 102 is a light absorption layer, thereby including a black pigment or a dark pigment, and absorbing visible light. A light absorption layer other than the adhesive layer 102 may be provided. The adhesive layer 102 may be subjected to working in order that characters are visible on the adhesive layer 102 when the discrimination medium 100 is peeled from the article 101.

The multilayer film 103 has 201 layers structured such that first films composed of a polyethylene-2,6-naphthalate and second films composed of a polyethylene terephthalate. The multilayer film 103 has a thickness of 20 μm. The adhesive layer 104 is composed of an ultraviolet light curable resin which transmits light after hardening, and has a thickness of 5 μm.

Figure 2:
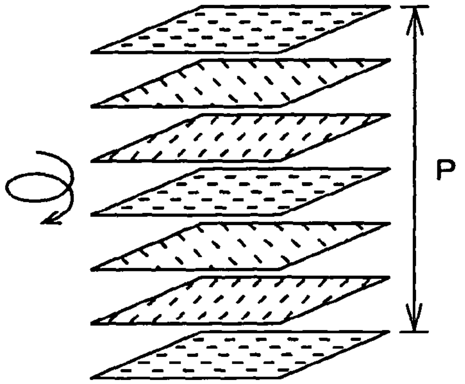
FIG. 2 is a conceptual diagram for explaining a structure of a cholesteric liquid crystal layer.
Figure 3:
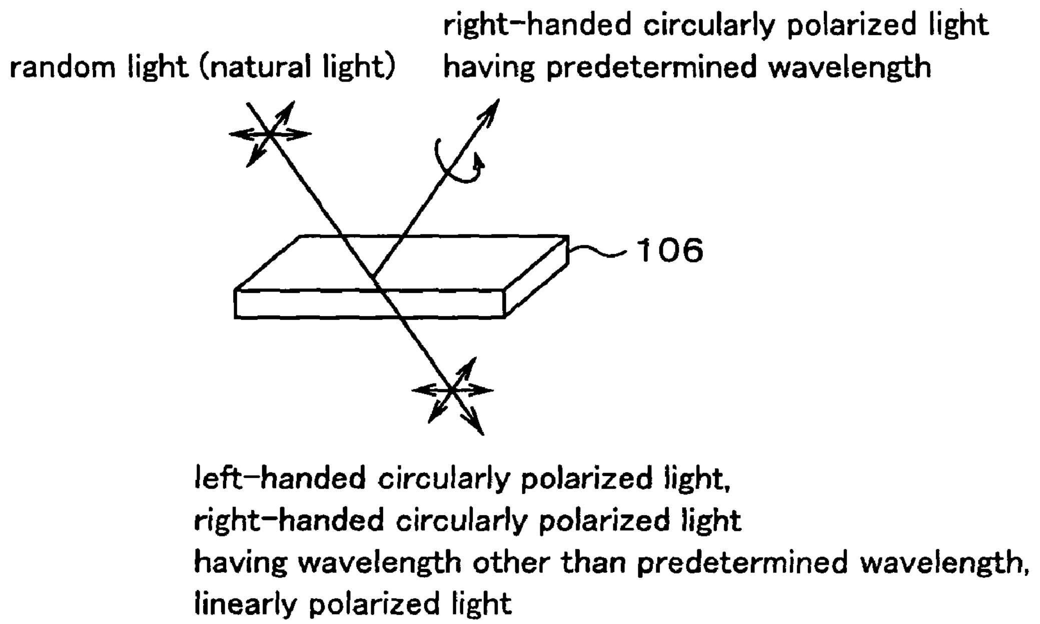
FIG. 3 is a conceptual diagram for explaining optical characteristics of a cholesteric liquid crystal layer.
Figure 4:
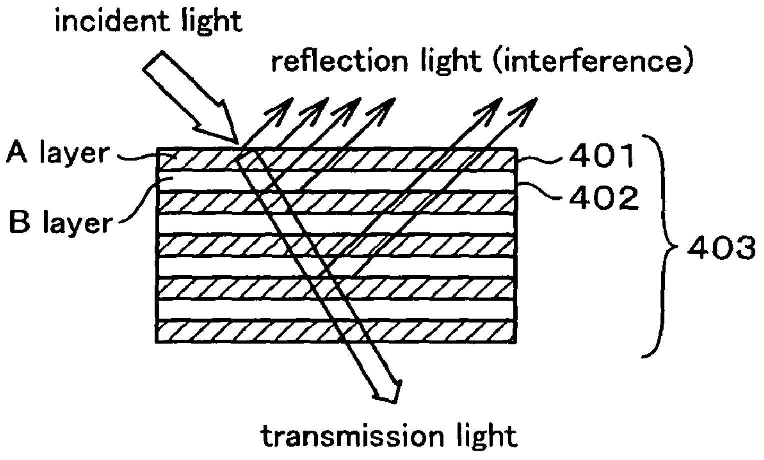
FIG. 4 is a conceptual diagram for explaining optical characteristics of a multilayer film.
Figure 5:
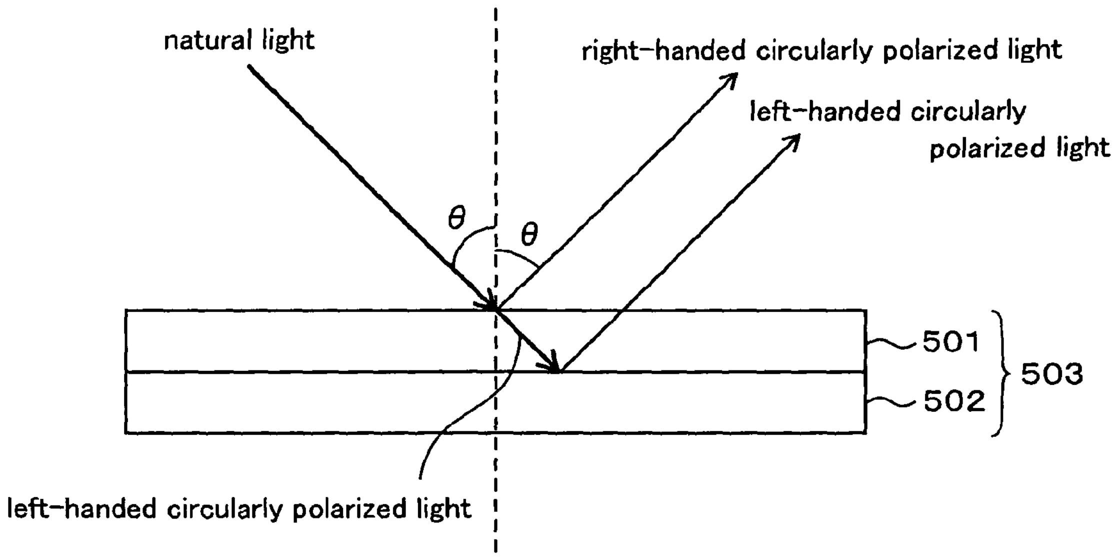
FIG. 5 is a conceptual diagram for explaining optical characteristics of a discrimination medium.
Figure 6:
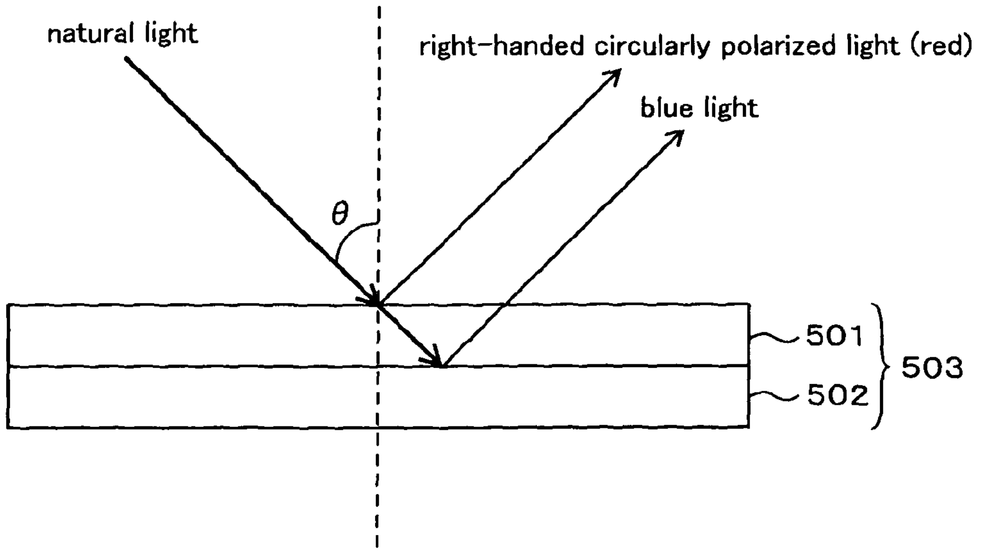
FIG. 6 is a conceptual diagram for explaining optical characteristics of a discrimination medium.

The cholesteric liquid crystal layer 106 has a structure shown in FIG. 2, and has a thickness of 1 μm. The cholesteric liquid crystal layer 106 is subjected to embossing, thereby having a hologram 105 formed thereon, which has an appropriate figure.

The surface protection layer 107 is composed of an isotropic triacetylcellulose (=TAC), and has a thickness of 40 μm. The surface protection layer 107 is isotropic in order to maintain the circular polarization direction of the transmission light passing therethrough. The material of the surface protection layer 107 is not limited to the above material.

In this example, right-handed circularly polarized light is reflected by the cholesteric liquid crystal layer 106. Light which is reflected by the multilayer film 103 and passes through the cholesteric liquid crystal layer 106 is other than right-handed circularly polarized light. In this example, when the discrimination medium 100 on which white light is irradiated is viewed at a viewing angle of 0 degrees, right-handed circularly polarized red light is reflected by the cholesteric liquid crystal layer 106. When the discrimination medium 100 on which white light is exposed is viewed at a predetermined viewing angle, the center wavelength of light reflected by the cholesteric liquid crystal layer 106 approximately corresponds to that of light reflected by the multilayer film 103. For example, this center wavelength is within a wavelength range of orange having a slightly yellow tinge.

A cholesteric liquid crystal layer is transferred to a multilayer film instead of integrally forming the multilayer film 103 and the cholesteric liquid crystal layer 106 by the adhesive layer 104. The hologram working may be performed on an upper surface or a lower surface of the cholesteric liquid crystal layer.

2. Production Method of Embodiment

One example of a production method of the First Embodiment will be explained hereinafter. First, a production method for the cholesteric liquid crystal layer 106 will be explained hereinafter.

For example, a low molecular cholesteric liquid crystal is dissolved and held in a polymerized monomer, so that cholesteric liquid crystals grow. After that, the low molecular liquid crystals are joined by photoreaction or thermal reaction, so that the molecular orientation thereof is fixed, and the low molecular liquid crystal is formed into a polymer thereof. As a result, raw liquid of cholesteric liquid crystal is obtained. The raw liquid is applied to a surface of the surface protection layer 107 to have a predetermined thickness. The raw liquid is oriented in a cholesteric orientation, and molecular orientation thereof is fixed. In this case, for example, the cholesteric liquid crystal has a uniform torsion pitch P extending in a molecular layered direction thereof, and has a layered thickness of 1 μm. The cholesteric liquid crystal layer appropriately has a thickness of about 0.5 to 5.0 μm. Next, the cholesteric liquid crystal layer 106 is subjected to embossing, so that the hologram 105 is formed. In the above manner, the cholesteric liquid crystal layer 106 is supported by the surface protection layer 107, and is formed.

Regarding another method for obtaining raw liquid of cholesteric liquid crystal, polymer thermotropic polymer liquid crystal of branched-chain type or straight-chain type may be heated above the liquid crystal transition point thereof, so that a cholesteric liquid crystal structure thereof grows, and may be then cooled to a temperature below the liquid crystal transition point, so that the molecular orientation thereof is fixed. Alternatively, polymer lyotropic liquid crystal of the branched-chain type or straight-chain type may be oriented in a cholesteric orientation in a solvent, and the solvent may be gradually evaporated, so that molecular orientation thereof is fixed.

Regarding raw materials of the above materials, a branched-chain type polymer having a liquid crystal forming group in a branched-chain, for example, polyacrylate, polymethacrylate, polysiloxane, or polymalonate may be used. Alternatively, a straight-chain type polymer having a liquid crystal forming group in a straight chain, for example, polyester, polyester amide, polycarbonate, polyamide, or polyimide, may be used.

Next, a production method for the multilayer film 103 will be explained hereinafter. First, 101 layers (A layers) are composed of polyethylene-2,6-naphthalate and 100 layers (B layers) are composed of polyethylene terephthalate including 12 mol % of isophthalic acid copolymerized therewith. The 101 layers (A layers) and the 100 layers (B layers) are laminated alternately, so that an unstretched sheet having 201 layers is produced. The sheet is stretched at a temperature of 140 degrees C. so as to be 3.5 times as long as the initial sheet in a longitudinal direction, and the sheet is stretched at a temperature of 150 degrees C. so as to be 5.7 times as long as the initial sheet in a lateral direction. Next, the sheet is subjected to heating at a temperature of 210 degrees C., and a laminated structure having a thickness of 20 μm is obtained. In the above manner, the multilayer film 103 is obtained.

Next, an ultraviolet light curable resin is applied to a surface of the multilayer film 103, so that a layer of an uncured material of the adhesive layer 104 is formed on the surface thereof. The cholesteric liquid crystal layer 106 is applied to the layer of the uncured material thereof. After that, ultraviolet rays are irradiated on the cholesteric liquid crystal layer 106, the layer of the uncured material is hardened, and the multilayer film 103 and the cholesteric liquid crystal layer 106 are integrally adhered by the adhesive layer 104. In the above manner, the discrimination medium 100 is obtained.

An adhesive of the adhesive layer 102 including a black pigment is applied to a surface on which the multilayer film 103 is exposed, and the discrimination medium 100 is applied and fixed to the appropriate article 101. When an adhesive film having a release sheet is used as the adhesive layer 102, the discrimination medium 100 which can be applied to an appropriate place as a seal is obtained.

3. Actions of Embodiment

Optical effects (that is, appearance) of the discrimination medium which is viewed from the surface protection layer 107 under white light or the like will be explained hereinafter.

When the discrimination medium 100 is viewed at a viewing angle of 0 degrees (that is, perpendicular to a surface of the discrimination medium 100), right-handed circularly polarized red light is reflected by the cholesteric liquid crystal layer 106, and the figure of the hologram 106 is seen to be red. When the discrimination medium 100 is inclined from the above condition and the viewing angle is larger, the color of light having a wavelength shorter than that of red light can be seen strongly. That is, the color of the discrimination medium 100 changes from red to the color of the light having a wavelength shorter than that of red light. When the viewing angle is further larger, the color of the discrimination medium 100 changes to the color of the light having a shorter wavelength and having a blue tinge. The color change is performed in combination with blue shift shown by the cholesteric liquid crystal layer 106 and blue shift shown by the multilayer film 103.

When the discrimination medium 100 is viewed via an optical filter allowing right-handed circularly polarized light to selectively pass therethrough in the same manner as the above, left-handed circularly polarized light reflected by the multilayer film 103 is blocked by the above optical filter, so that only the blue shift shown by the cholesteric liquid crystal layer 106 is seen.

In contrast, when the discrimination medium 100 is viewed via an optical filter allowing left-handed circularly polarized light to selectively pass therethrough in the same manner as the above, right-handed circularly polarized light reflected by the cholesteric liquid crystal layer 106 is blocked by the above optical filter, so that only the blue shift shown by the multilayer film 103 is seen.

Therefore, the optical filters allowing right-handed circularly polarized light to selectively pass therethrough and allowing left-handed circularly polarized light to selectively pass therethrough are prepared, and the discrimination medium 100 is viewed by selectively using the above optical filters. As a result, optical characteristics of the cholesteric liquid crystal layer 106 and optical characteristics of the multilayer film 103 can be separately seen, and the difference therebetween can be discriminated.

White light may be irradiated on the discrimination medium 100 via an optical filter allowing a predetermined circularly polarized light to selectively pass therethrough. For example, when right-handed circularly polarized light is irradiated on the discrimination medium 100 via an optical filter allowing right-handed circularly polarized light to selectively pass therethrough, the reflection light reflected by the discrimination medium 100 is only reflection light reflected by the cholesteric liquid crystal layer 106. The above optical filter is selectively used, so that the difference in optical characteristics can be discriminated.

For example, when left-handed circularly polarized light is irradiated on the discrimination medium 100 via an optical filter allowing left-handed circularly polarized light to selectively pass therethrough, the reflection light reflected by the discrimination medium 100 is only reflection light reflected by the multilayer film 103. The above optical filter is selectively used, so that the difference can be discriminated between the case of using the optical filter and the case of not using the optical filter in optical characteristics.

In the above manner, when the discrimination medium 100 is simply viewed by changing the viewing angle, the discrimination medium 100 shows complicated and unique color change, so that the discrimination medium 100 can be discriminated. When the above viewing of the discrimination medium 100 is performed by using the above optical filter, large differences can be discriminated between the case of using the optical filter and the case of not using the optical filter in viewing of the discrimination medium 100.

Second Embodiment

Figure 7:
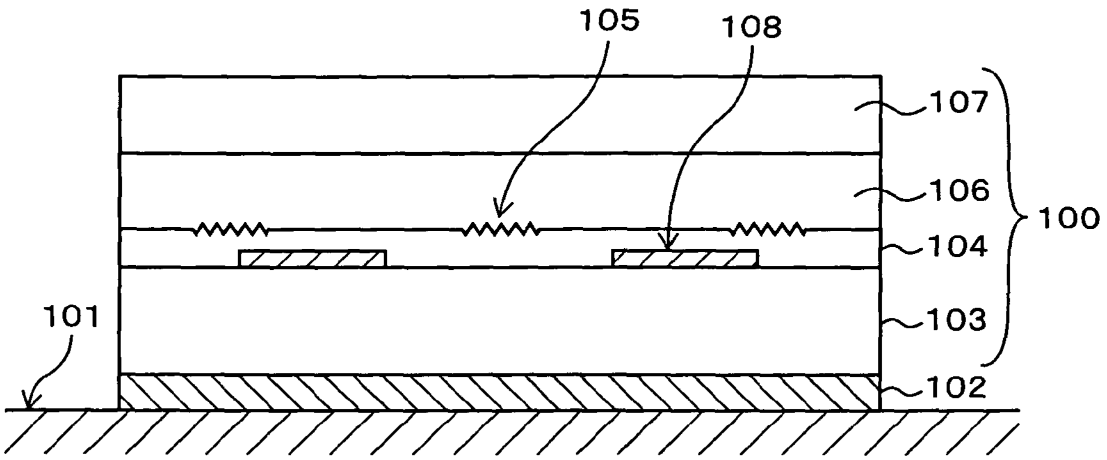
FIG. 7 is a cross sectional view showing a discrimination medium in cross section.

FIG. 7 is a cross sectional diagram showing a structure of another embodiment in a cross section. In the Second Embodiment, a FIG. 108 formed by printing is added to the structure shown in FIG. 1.

For example, in the above structure of the Second Embodiment, when the discrimination medium 100 is viewed at a predetermined angle, the color of reflection light reflected by the cholesteric liquid crystal layer 106 is approximately equal to that of reflection light reflected by the multilayer film 103. The color of the FIG. 108 is set to the same color as those of the cholesteric liquid crystal layer 106 and the multilayer film 103.

In the above case, when the discrimination medium 100 is viewed at a predetermined angle, a predetermined color is highlighted. In this case, the hologram 105 is seen. However, since the hologram 105 has the same color as the surroundings, the hologram 105 is difficult to see.

When the viewing angle is changed, the color of the surroundings changes in accordance with blue shift, and the FIG. 108 appears on the surface of the discrimination medium 100. The discrimination medium 100 can be discriminated by using the above phenomenon.

When the discrimination medium 100 is viewed via an optical filter allowing right-handed circularly polarized light to selectively pass therethrough, the FIG. 108 is difficult to see since left-handed circularly polarized light is blocked by the above optical filter. However, the figure of the hologram 105 can be seen. When the viewing of the discrimination medium 100 is performed by increasing the viewing angle without the above optical filter, the color of the reflection light reflected by the multilayer film 103 changes. As a result, the figure appears on the surface of the discrimination medium 100. The hologram 105 and the FIG. 108 can be simultaneously recognized.

Third Embodiment

A gap may be formed to a portion of the discrimination medium of the present invention. In this case, when the discrimination medium is forcibly peeled from the article in order to reuse it, the discrimination medium is torn from the above gap, and it cannot be reused. This structure can be applied to opening discrimination seals which are used for determining whether or not a package has been unsealed.

Fourth Embodiment

The discrimination medium of the present invention may have a structure such that interlayer peeling or peeling breaking preferably occurs at a portion thereof. For example, interlayer peeling preferably easily occurs in the cholesteric liquid crystal layer purposely. For example, in the structure shown in FIG. 1, when the discrimination medium 100 is peeled from the article 101, interlayer peeling preferably occurs in the layered structure of the cholesteric liquid crystal layer 106 before the adhesion force of the adhesive layer 102 is lost. In this case, reuse of the discrimination medium 100 by peeling it off the article 101 can be prevented. For example, the interlayer peeling of the cholesteric liquid crystal layer 106 easily occurs by controlling temperature conditions in production of the discrimination medium 100.

In the discrimination medium of the present invention, the fix strength between the cholesteric liquid crystal layer and the multilayer film may be weaker than the adhesion strength between the discrimination medium and the article. For example, in the structure shown in FIG. 1, the adhesion strength of the adhesive layer 104 may be weaker than that of the adhesive layer 102. In this case, when the discrimination medium 100 is forcibly peeled from the article 101, the cholesteric liquid crystal layer 106 is previously peeled from the multilayer film 103, so that reuse of the discrimination medium 100 can be prevented.

In order to realize the above feature, a material having a strength weaker than that of the adhesion layer 102 is used as the material of the adhesion layer 104.

Fifth Embodiment

The Fifth Embodiment differs from the First Embodiment in that the reflection light reflected by the multilayer film 103 is different from that reflected by the cholesteric liquid crystal layer 106. In this case, two colors can be seen simultaneously. Since two blue shifts are synergistically shown, visual effects can be obtained such that the complicated appearance of the discrimination medium 100 can be seen depending on the viewing angle. In this case, visual effects can be obtained such that the color of the discrimination medium 100 viewed without optical filters, the color of the discrimination medium 100 viewed via an optical filter allowing left-handed circularly polarized light to pass therethrough, and the color of the discrimination medium 100 viewed via an optical filter allowing right-handed circularly polarized light to pass therethrough are different from each other.

Sixth Embodiment

Figure 8:
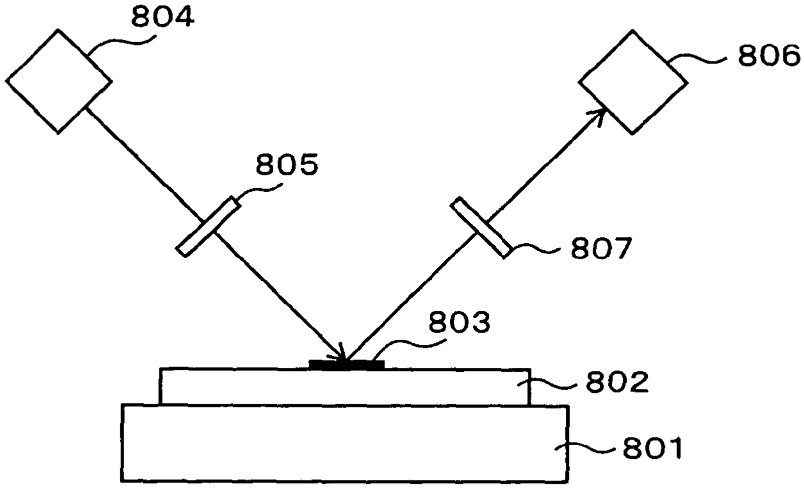
FIG. 8 is a schematic diagram showing a discrimination apparatus in cross section.

FIG. 8 is a schematic diagram showing one example of a discrimination apparatus of the present invention. A discrimination apparatus shown in FIG. 8 is equipped with a pedestal 801, a white lamp 804, an optical filter 805, a photodetector 806, and an optical filter 807. The optical filter 805 allows a predetermined circularly polarized light to selectively pass therethrough. The optical filter 807 allows a predetermined circularly polarized light to selectively pass therethrough. The optical filters 805 and 807 are removably provided to an optical path separately.

A discrimination medium 803 using the present invention is fixed to an article 802. The article 802 is mounted on the pedestal 801. It can be determined whether or not the article 802 is authentic. The white lamp 804 emits light which has a wavelength limited to a predetermined wavelength region and which does not have a predetermined circular polarization direction.

One example of actions of the discrimination apparatus will be explained hereinafter. In this example, light emitted by the white lamp 804 enters into the discrimination medium 803 at an incident angle of 45 degrees. The reflection light reflected by the discrimination medium 803 enters to the photodetector 806 at a viewing angle of 45 degrees. The discrimination medium 803 has a structure shown in FIG. 1. When the discrimination medium 803 on which white light is irradiated is viewed at a viewing angle of 45 degrees, right-handed circularly polarized red light is reflected by the cholesteric liquid crystal layer 106, and left-handed circularly polarized red light is reflected by the multilayer film 103.

First, a discrimination method in which the optical filter 807 is used and the optical filter 805 is not used will be explained. In order to determine whether or not the discrimination medium 803 is authentic, the article 802 is mounted to the pedestal 801, and position of the article 802 on the pedestal 801 is adjusted so that light is irradiated on the discrimination medium 803. Next, the white lamp 804 is lighted, and white light is irradiated on the discrimination medium 803. The optical filter 807 allowing a right-handed circularly polarized light to selectively pass therethrough is provided to an optical path of the reflection light reflected by the discrimination medium 803. In this case, only the red reflection light reflected by the cholesteric liquid crystal layer 106 is detected by the photodetector 806. On the other hand, the optical filter 807 is removed from the optical path of the reflection light reflected by the discrimination medium 803. In this case, not only the red reflection light reflected by the cholesteric liquid crystal layer 106, but also the red reflection light reflected by the multilayer film 103, is detected by the photodetector 806. As a result, the amount of the light detected by the photodetector 806 is increased in comparison to the case in which the optical filter 807 is provided to the optical path of the reflection light reflected by the discrimination medium 803. That is, output obtained by the photodetector 806 when the optical filter 807 is used is different from that obtained by the photodetector 806 when the optical filter 807 is not used, so that the discrimination medium 803 can be discriminated.

In the same manner as the above, an optical filter allowing left-handed circularly polarized light to pass therethrough may be used as the optical filter 807. In this case, when the optical filter 807 is provided to the optical path, the reflection light reflected by the cholesteric liquid crystal layer 106 is blocked by the optical filter 807, and only the left-handed circularly polarized reflection light reflected by the multilayer film 103 is detected by the photodetector 806. On the other hand, the optical filter 807 is removed from the optical path. In this case, the reflection light reflected by the multilayer film 103 includes the left-handed circularly polarized light, linearly polarized light, and reflection light reflected by the cholesteric liquid crystal layer 106. As a result, the amount of the light detected by the photodetector 806 is very different from that of the case in which the optical filter 807 is provided to the optical path, so that the discrimination medium 803 can be discriminated.

Next, a discrimination method in which the optical filter 805 is used and the optical filter 807 is not used will be explained. In this case, when the white lamp 804 is lighted, and the optical filter 805 allowing right-handed circularly polarized light to selectively pass therethrough is provided to the light irradiation path, only reflection light reflected by the cholesteric liquid crystal layer 106 is detected by the photodetector 806. On the other hand, when the optical filter 805 is removed from the light irradiation path, not only reflection light reflected by the cholesteric liquid crystal layer 106, but also reflection light reflected by the multilayer film 103, is detected by the photodetector 806.

Next, another discrimination method in which the discrimination medium 803 on which white light is irradiated is viewed at a viewing angle of 45 degrees, right-handed circularly polarized red light is reflected by the cholesteric liquid crystal layer 106, and blue light is reflected by the multilayer film 103. In this case, an optical filter allowing left-handed circularly polarized red light to selectively pass therethrough is used as the optical filter 805.

In the above feature, when the optical filter 805 is provided to an optical path, and the optical filter 807 is removed from an optical path, white light is irradiated on the discrimination medium 803 by the white lamp 804, blue light is detected by the photodetector 806. This is because right-handed circularly polarized light included in incident light entering the discrimination medium 803 is blocked by the optical filter 805, so that reflection light reflected by the cholesteric liquid crystal layer 106 is not detected.

When the optical filter 805 is removed from the optical path, and white light is directly irradiated on the discrimination medium 803 by the white lamp 804, red light and blue light are detected by the photodetector 806. This is because reflection light reflected by the multilayer film 103 and reflection light reflected by the cholesteric liquid crystal layer 106 are detected by the photodetector 806.

In the above case, the amount of the light detected by the photodetector 806 when the optical filter 805 is provided to the optical path is different from that of the light detected by the photodetector 806 when the optical filter 805 is removed from the optical path. The output of the photodetector 806 when the optical filter 805 is provided to the optical path is thereby different from that of the photodetector 806 when the optical filter 805 is removed from the optical path, so that the discrimination medium 803 can be discriminated. For example, when the photodetector 806 can selectively discriminate light having a predetermined wavelength, the spectral distribution of the reflection light reflected by the discrimination medium 803 when the optical filter 805 is provided to the optical path is different from that of the photodetector 806 when the optical filter 805 is removed from the optical path, so that the output of the photodetector 806 when the optical filter 805 is provided to the optical path can be different from that of the photodetector 806 when the optical filter 805 is removed from the optical path. As a result, the discrimination medium 803 can be discriminated.

In the above manner, when the discrimination medium 803 is directly viewed, unique optical characteristics are detected, so that the discrimination medium 803 can be discriminated. In this case, the optical filters 805 and 807 can be used. A photographing device may be used as the photodetection device 806, electronic processing is performed on images photographed by the photographing device. Alternatively, images photographed by the photographing device may be viewed.

INDUSTRIAL APPLICABILITY

The present invention can be applied to techniques for determining whether or not passports, documents, various cards, passes, bills, exchange tickets for money, bonds, security notes, gift certificates, pictures, tickets, public game voting tickets, recording media in which sound data and image data are recorded, recording media in which computer software is recorded, various products, and packages of the products are authentic. The discrimination medium of the present invention can be used for opening discrimination seals for discriminating whether or not a package has been unsealed.

The invention claimed is:

1. A discrimination medium comprising:

a first adhesive layer;

a cholesteric liquid crystal layer provided on the first adhesive layer, the cholesteric liquid crystal layer having a circular polarization light selectivity of reflecting predetermined circularly polarized light as a first reflection light, the cholesteric liquid crystal layer having a side to which natural light may enter;

a second adhesive layer provided on an outer surface of the cholesteric liquid crystal layer parallel to the first adhesive layer; and a multilayer film provided on the second adhesive layer, the multilayer film having a stacked structure in which a plurality of first light transparent films having a first refraction index and a plurality of second light transparent films having a second refraction index are alternately laminated in a thickness direction, each first light transparent film and the each second light transparent film having an interface therebetween, each interface reflecting light so as to generate interfering light, wherein the cholesteric liquid crystal layer and the multilayer film are arranged in a direction in which natural light may enter, the multilayer film reflects the interfering light as a second reflection light, and the discrimination medium is discriminated by using the first reflection light and the second reflection light, the first reflection light is circularly polarized light having a predetermined center wavelength and a predetermined polarization direction, the second reflection light includes circularly polarized light having a circularly polarized direction opposite to that of the first reflection light, the second reflection light shows a blue shift in which a color of the reflection light is changed when a viewing angle is changed, when the discrimination medium is viewed at a predetermined angle, the first reflection light reflected by the cholesteric liquid crystal layer and the second reflection light reflected by the multilayer film are approximately equal to each other in color, when the discrimination medium is viewed through a circularly polarized light filter allowing the first reflection light to selectively pass therethrough, the second reflection light is not viewed but the first reflection light is selectively viewed, and when the discrimination medium is viewed through a circularly polarized light filter allowing circularly polarized light having a circularly polarized direction opposite to that of the first reflection light to selectively pass therethrough, the first reflection light is not viewed but the second reflection light is selectively viewed.

2. The discrimination medium according to claim 1, further comprising a figure provided to at least a portion of one of the cholesteric liquid crystal layer and the multilayer film.

3. The discrimination medium according to claim 1, wherein at least a portion of at least one of the cholesteric liquid crystal layer and the multilayer film is subjected to hologram working or embossing.

4. The discrimination medium according to claim 1, further comprising an interlayer peeling structure or a peeling breaking structure.

5. An article to be discriminated comprising the discrimination medium according to claim 1.

6. The discrimination medium according to claim 1, wherein the second reflection light is shut by an optical filter allowing only the first reflection light to pass therethrough when a discrimination medium is viewed through the optical filter.

7. The discrimination medium according to claim 1, wherein the cholesteric liquid crystal layer is formed with a hologram, the hologram is not viewed and the second reflection light is viewed when a discrimination medium is viewed through an optical filter allowing only circularly polarized light having inverse polarization direction of the first reflection light to pass therethrough, and color of the second reflection light changes when the discrimination medium is inclined.

8. The discrimination medium according to claim 1, wherein the multilayer film is formed with a hologram, the hologram is not viewed when a discrimination medium is viewed through an optical filter allowing only the first reflection light to pass therethrough, and the hologram is viewed when a discrimination medium is viewed through an optical filter allowing only circularly polarized light having inverse polarization direction of the first reflection light to pass therethrough.

9. The discrimination medium according to claim 1, wherein the cholesteric liquid crystal layer is formed with a first hologram, the multilayer film is formed with a second hologram, the first and second holograms are viewed in overlapping each other when a discrimination medium is directly viewed, the first hologram is selectively viewed when a discrimination medium is viewed through an optical filter allowing only the first reflection light to pass therethrough, and the second hologram is selectively viewed when a discrimination medium is viewed through an optical filter circularly polarized light having inverse polarization direction of the first reflection light to pass therethrough.

* * * * *